US012755308B2

(12) United States Patent
Colpitts

(10) Patent No.: US 12,755,308 B2
(45) Date of Patent: Oct. 6, 2026

(54) METHOD AND SYSTEM FOR CUSTOMIZING A HAIR APPLIANCE

(71) Applicant: Conair LLC, Stamford, CT (US)

(72) Inventor: Dennis Joseph Colpitts, Fairfield, CT (US)

(73) Assignee: Conair LLC, Stamford, CT (US)

(*) Notice: Subject to any disclaimer, the term of this patent is extended or adjusted under 35 U.S.C. 154(b) by 667 days.

(21) Appl. No.: 16/750,229

(22) Filed: Jan. 23, 2020

(65) Prior Publication Data

US 2021/0233135 A1 Jul. 29, 2021

(51) Int. Cl.

| | |
|---|---|
| ***G06Q 30/0601*** | (2023.01) |
| ***A45D 26/00*** | (2006.01) |
| ***B26B 19/38*** | (2006.01) |
| ***G06F 3/04845*** | (2022.01) |
| *B26B 19/06* | (2006.01) |
| *G06F 3/0482* | (2013.01) |

(52) U.S. Cl.

CPC ......... *G06Q 30/0621* (2013.01); *A45D 26/00* (2013.01); *B26B 19/3846* (2013.01); *B26B 19/3853* (2013.01); *B26B 19/3893* (2013.01); *G06F 3/04845* (2013.01); *G06Q 30/0643* (2013.01); *B26B 19/06* (2013.01); *G06F 3/0482* (2013.01)

(58) Field of Classification Search

CPC ........... G06Q 30/0621; G06Q 30/0643; G06Q 30/0641; G06Q 30/0601; G06Q 30/0603; G06Q 30/0605; G06Q 30/0611; G06Q 30/0623; G06Q 30/0627; G06Q 30/0633; A45D 26/00; B26B 19/3846; B26B 19/3853; B26B 19/3893; B26B 19/00; B26B 19/02; B26B 19/3873; B26B 19/06; G06F 3/04845; G06F 3/0482; G06F 3/048; G06F 3/0481

USPC ................................................ 705/26.5, 26.1

See application file for complete search history.

(56) References Cited

U.S. PATENT DOCUMENTS 5,964,037 A * 10/1999 Clark ...................... B26B 19/20 30/223
6,314,648 B1 * 11/2001 Hillebrandt ............ B26B 19/10 30/208
8,295,962 B2 10/2012 Jones et al.
(Continued)

FOREIGN PATENT DOCUMENTS

WO 2000/060426 10/2000
WO 2019/011523 1/2019

OTHER PUBLICATIONS

International Search Report dated Mar. 29, 2021 issued in corresponding PCT Application No. PCT/US2020/067443.

*Primary Examiner* — Phong H Nguyen
(74) *Attorney, Agent, or Firm* — Grogan, Tuccillo & Vanderleeden LLP

(57) ABSTRACT

A method for customizing a hair appliance includes the steps of generating a rendering of a hair appliance to be customized, displaying the rendering of the hair appliance on a graphical display of a remote terminal, receiving user input through the remote terminal for modifying a characteristic of at least one feature of the hair appliance, generating a modified rendering of the hair appliance to be customized based upon the user input received, and, displaying the modified rendering of the hair appliance on the graphical display of the remote terminal.

6 Claims, 18 Drawing Sheets

(56) References Cited

U.S. PATENT DOCUMENTS

| | | | | |
|---|---|---|---|---|
| 8,341,846 | B1 * | 1/2013 | Holmes | B26B 19/20 30/208 |
| 2002/0116823 | A1 * | 8/2002 | Moser | B26B 19/04 30/43.92 |
| 2003/0051346 | A1 * | 3/2003 | McCambridge | B26B 19/06 30/122 |
| 2005/0028371 | A1 * | 2/2005 | Kakimoto | B26B 19/288 30/43.92 |
| 2005/0071242 | A1 * | 3/2005 | Allen | G06Q 30/0621 705/26.5 |
| 2006/0123633 | A1 * | 6/2006 | Hauer | B26B 19/20 30/201 |
| 2006/0242848 | A1 * | 11/2006 | Ciccone | B26B 21/4037 30/539 |
| 2010/0293071 | A1 * | 11/2010 | Brownell | G06Q 30/0643 705/27.2 |
| 2013/0333219 | A1 * | 12/2013 | Oxford | B26B 21/34 30/41.6 |
| 2014/0053412 | A1 | 2/2014 | Carlucci et al. | |
| 2014/0108148 | A1 * | 4/2014 | Paul | G06Q 10/101 705/14.58 |
| 2016/0096280 | A1 * | 4/2016 | Robertson | B26B 21/24 30/53 |
| 2019/0184587 | A1 * | 6/2019 | Mount | B26B 19/16 |
| 2019/0230070 | A1 * | 7/2019 | Isaacson | H04W 12/084 |

* cited by examiner

FIG. 7
410
7:55 PM Thu Jan 16
87%
Customize Product
DONE
412
420
Select Body Part to be Personalized.
416
Housing
Handle
Logo Plate
Bottom Cap
Taper Arm
Blade
Select Plating/Color
430
Gold Plating

FIG. 8
410
7:58 PM Thu Jan 16
87%
Customize Product
DONE
422
412
Select Body Part to be Personalized.
416
Housing
Handle
Logo Plate
Bottom Cap
Taper Arm
Blade
Select Plating/Color
430
Black Paint

FIG. 9
410
7:59 PM Thu Jan 16
87%
Customize Product
DONE
412
424
Select Body Part to be Personalized.
416
Housing
Handle
Logo Plate
Bottom Cap
Taper Arm
Blade
Select Plating/Color
430
Black Paint

FIG. 10
410
7:59 PM Thu Jan 16
87%
Customize Product
DONE
426
412
Select Body Part to be Personalized.
416
Housing
Handle
Logo Plate
Bottom Cap
Taper Arm
Blade
Select Plating/Color
430
Gold Plating

FIG. 13
410
7:59 PM Thu Jan 16
87%
Customize Product
DONE
412
Select Body Part to be Personalized.
Housing
Handle
Logo Plate
Bottom Cap
Taper Arm
Blade
Select Blade
Fade
Taper
Finishing
Fade/Black Graphite
CHANGE

FIG. 15
410
8:00 PM Thu Jan 16
87%
440
Cart Summary
ADD MORE ITEMS
BaBylissPRO CustomFX Clipper | Model FX870CFX
Housing
Red Paint
Handle
Gold Plating
Logo Plate
Black Paint
Bottom Cap
Black Paint
Taper Arm
Gold Plating
Blade / Finishing
Fade / Black Graphite
EDIT
DELETE
Item Cost
$ 249.99
Sales Tax
$ 25.62
Total
$ 275.61
CONTINUE TO CHECKOUT
Disclaimer: All Custom FX clippers are covered by a Babyliss Professional 2 YEAR Limited Warranty covering any manufacturing defects.
Because this clipper is being created just for you, there are no returns or exchanges.

FIG. 16
410
8:25 PM Thu Jan 16
82%
442
Pickup Details
Choose Service Type
PICK-UP
DELIVERY (Coming Soon)
Enter your Full Name below
First Name
Last Name
Enter your Email
Email
Confirm Email
Enter your Phone Number
Phone Number
Confirm Phone Number
CONTINUE TO CHECKOUT
Terms of use
Do not sell my information (CA policy)
Privacy policy
Disclaimer: All Custom FX clippers are covered by a Babyliss Professional 2 YEAR Limited Warranty covering any manufacturing defects. Because this clipper is being created just for you, there are no returns or exchanges.

METHOD AND SYSTEM FOR CUSTOMIZING A HAIR APPLIANCE

FIELD OF THE INVENTION

The present invention relates generally to cosmetic devices such as hair tools and, more particularly, to a system and method for creating customized hair tools and appliances.

BACKGROUND OF THE INVENTION

Electric hair trimmers or clippers enjoy widespread use in professional salons by hair stylists or by private users to trim scalp or beard hair. Another area of application is body grooming, in which the user primarily wishes to achieve an esthetic effect by thoroughly removing hair in other areas of the body, for example in the armpit area, the bikini zone or in intimate areas.

As electronic communication has become more popular, consumers are using this medium more frequently to obtain goods and services. Many consumers now employ the Internet, accessed through computers or personal electronic devices such as smartphones and tablets, to purchase articles ranging from airline tickets to automobiles. For example, some consumers may access one or more Web pages maintained on a retailer's computer through the Internet, and then use these Web pages to view, select and purchase a product from that retailer.

Some retailers have taken advantage of the flexibility offered by these electronic marketplaces to provide consumers with a broader range of choices for goods and services. For example, some manufacturers and retailers now permit a consumer to customize a manufactured article by specifying the characteristics of one or more features of the article, such as its size, color, or the structure of its construction. Some manufacturers and retailers may even permit a consumer to select one or more images to be emblazoned on the article. Typically, the manufacturer or retailer will provide the consumer with some type of graphical user interface for specifying the characteristics of the customizable features of the article. This type graphical user interface thus will display the choice of characteristics that a consumer can select for a customizable feature of the article.

Existing systems, however, have typically been limited for use in customizing wearable apparel, such as shirts, jeans and footwear. In view of the above, there is therefore a need for a system and method that allows a user to customize personal care appliances such as hair trimmers and clippers. In particular, while existing hair trimmers produced by known means are generally suitable for what is regarded as ordinary performance, there is a need for a system and method of creating customized hair appliances, such as hair trimmers, that are specifically tailored to the characteristics and preferences of each individual consumer.

SUMMARY OF THE INVENTION

It is an object of the present invention to provide a hair appliance.

It is another object of the present invention to provide a hair appliance having a customized configuration and/or color scheme.

It is another object of the present invention to provide a method of manufacturing a hair appliance having a customized configuration and/or color scheme.

These and other objectives of the present invention, and their preferred embodiments, shall become clear by consideration of the specification, claims and drawings taken as a whole.

According to an embodiment of the invention, a method for customizing a hair appliance includes the steps of generating a rendering of a hair appliance to be customized, displaying the rendering of the hair appliance on a graphical display of a remote terminal, receiving user input through the remote terminal for modifying a characteristic of at least one feature of the hair appliance, generating a modified rendering of the hair appliance to be customized based upon the user input received, and, displaying the modified rendering of the hair appliance on the graphical display of the remote terminal.

According to another embodiment of the invention, a system for customizing a hair appliance includes a manufacturing facility and a remote terminal in communication with the manufacturing facility via a network. The remote terminal is configured to generate a rendering of a hair appliance to be customized, display the rendering of the hair appliance on a graphical display of a remote terminal, receive user input for modifying a characteristic of at least one feature of the hair appliance, generate a modified rendering of the hair appliance to be customized based upon the user input received, and display the modified rendering of the hair appliance on the graphical display of the remote terminal.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
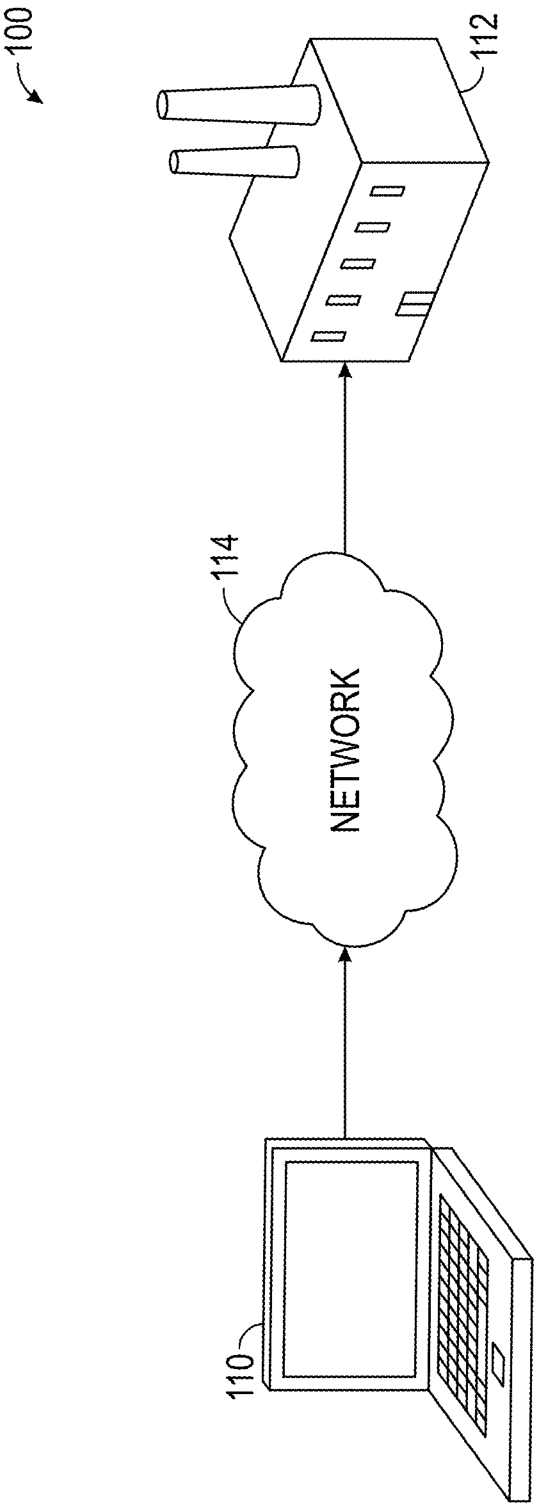
FIG. 1 is a schematic illustration of a hair appliance customization system according to an embodiment of the present invention.

FIG. 1 is a schematic diagram of an illustrative embodiment of hair appliance customization system 100. The term customization system, as used throughout this detailed description, preferably refers to a system for manufacturing hair appliances such as, for example, hair trimmers (also referred to as hair clippers). In some embodiments, the hair appliances may be customized by the manufacturer or a third party designer. In a preferred embodiment, the hair appliances may be customized by the party purchasing the hair appliances.

As shown therein, customization system 100 includes a remote terminal 110 connected to factory or manufacturing facility 112 by way of network 114. Generally, remote terminal 110 may be any type of computer, including either a desktop or a laptop computer. In other embodiments, remote terminal 110 may be any type of device that includes a display, a processor, and the ability to transmit and receive data from a remote network. Examples of such devices include, but are not limited to, PDAs, cell phones, smartphones, tables, etc., as well as other types of devices. In an embodiment, the remote terminal may be, for example, a smartphone, tablet or computer capable of running a mobile software application, as discussed below.

In this embodiment, factory 112 represents a manufacturing system configured to manufacture hair appliances. Here, factory 112 is shown as a single building for illustrative purposes only. In many cases, factory 112 will comprise many buildings. In some cases, factory 112 may comprise many buildings that are disposed in different geographic locations. Generally, the term factory, as used here, may also refer to distributors and/or suppliers. In other words, the term factory may also apply to various operations on the manufacturing side, including the operations responsible for parts, labor, and/or retail of the hair appliances, as well as other manufacturing side operations.

Preferably, network 114 is configured to relay information between remote terminal 110 and factory 112. Generally, network 114 may be a system allowing for the exchange of information between computer 110 and factory 112. Examples of such networks include, but are not limited to, personal area networks, local area networks, wide area networks, client-server networks, peer-to-peer networks, as well as other types of networks. Additionally, the network may support wired transmissions, wireless transmissions, or both wired and wireless transmissions. In some embodiments, network 114 may be a packet-switched communications system. In a preferred embodiment, network 114 may be the Internet.

Figure 2:
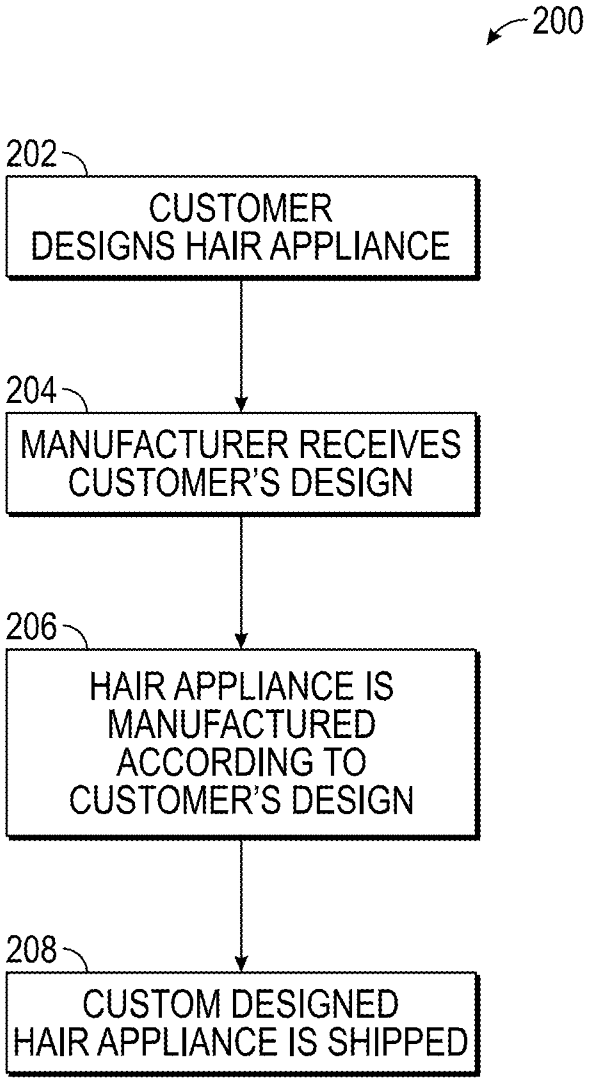
FIG. 2 is a flow chart showing a customization process carried out by the hair appliance customization system of FIG. 1, according to an embodiment of the present invention.

Referring to FIG. 2, customization system 100 preferably includes provisions that allow a customer to design hair appliance that will be produced by a manufacturer. Process 200 is a flow diagram of how customization system 100 may operate. During first step 202, a customer may interact with a website or mobile application running on a computer or smartphone in order to design the hair appliance. Once the customer has finalized the design, the manufacturer may receive the customer's design, at step 204. Following this, the hair appliance is preferably manufactured according to the customer's design, at step 206. Finally, at step 208, the custom designed hair appliance may be shipped to the customer.

Figure 3:
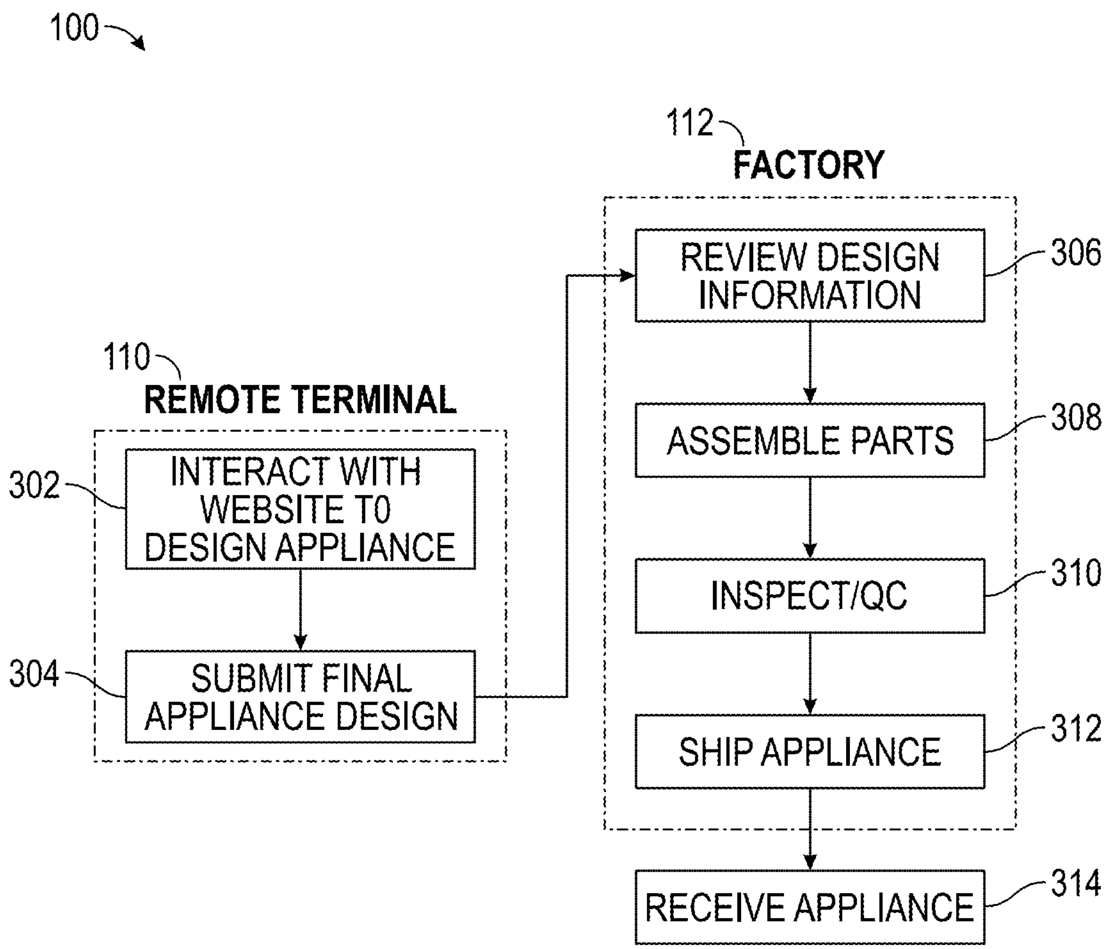
FIG. 3 is a flow chart illustrating a more detailed customization process carried out by the hair appliance customization system of FIG. 1, according to an embodiment of the present invention.
Figure 4:
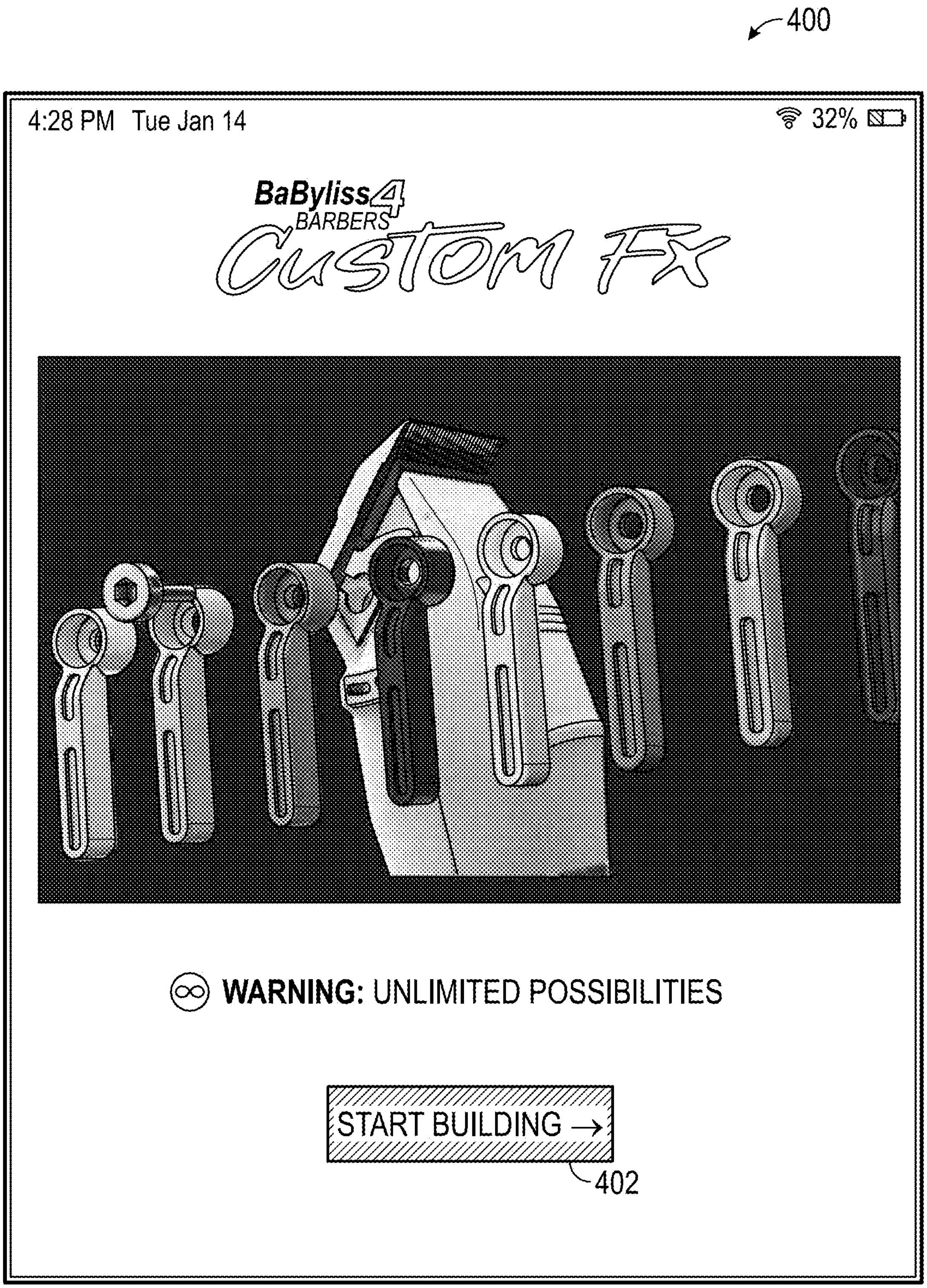
FIG. 4 is a representation of a home screen of a mobile application for creating a customized hair application, according to an embodiment of the present invention.

Referring to FIG. 3, customization system 100 may be best understood by separating the steps associated with remote terminal 110 and those associated with factory 112. Preferably, those steps associated with remote terminal 110 are performed on or by remote terminal 110 and those steps associated with factory 112 are performed on or by factory 112. However, this is not necessarily the case, and some of the steps associated with remote terminal 110 may be performed on or by factory 112 or some other resource, and some of the steps associated with factory 112 may be performed on or by remote terminal 110 or some other resource.

In first step 302, a customer may access a remote website or mobile application with remote terminal 110. Preferably, the customer may use the mobile application to design a customized hair appliance during this step. Here, the terms website and/or mobile application are used in the most general sense as meaning any collection of data located on a remote server (or stored locally) accessible with a web browser or mobile application of some kind. In many cases, a website may be a collection of web pages found on the World Wide Web. In a preferred embodiment, the term web page may refer to any HTML/XHTML document.

Preferably, factory 112 includes a server of some type that supports a website with a graphical interface system. This graphical interface system may be preferably used to design a hair appliance. In some embodiments, the graphical interface system may be a graphical editor of some kind. In a preferred embodiment, the graphical interface system may provide a set of tools that allow the customer to easily apply a custom design to a hair appliance.

In an alternative embodiment, a website supporting a graphical interface system may be hosted outside of factory 112. For example, the graphical interface system may be part of a mobile application running on a smartphone, computer or tablet. Generally, the process of customizing a hair appliance may proceed as before. In this case, the finalized design information will be processed and sent to the manufacturer over the network 114.

Once the customer has finished designing the hair appliance, the finalized design may be submitted to factory 112 during second step 304. In some embodiments, the submission may be transferred through the Internet. Following this submission, factory 112 preferably receives and reviews the customized design, at step 306.

At step 308, once the various chosen components have been collected, they are assembled. Following this, the finished hair appliance is preferably inspected, at step 310. During the last two steps, 312 and 314, the hair appliance is preferably shipped from factory 112 to a pre-designated shipping address.

The following description discusses the details of the steps outlined and briefly described with reference to FIG. 3. Preferably, a customer has access to a remote terminal. Using the remote terminal, the customer may gain access to a website or mobile application supplied by the manufacturer or a third party. In some embodiments, the website or mobile application may include a graphical interface system, as discussed briefly in first step 302.

Figure 5:
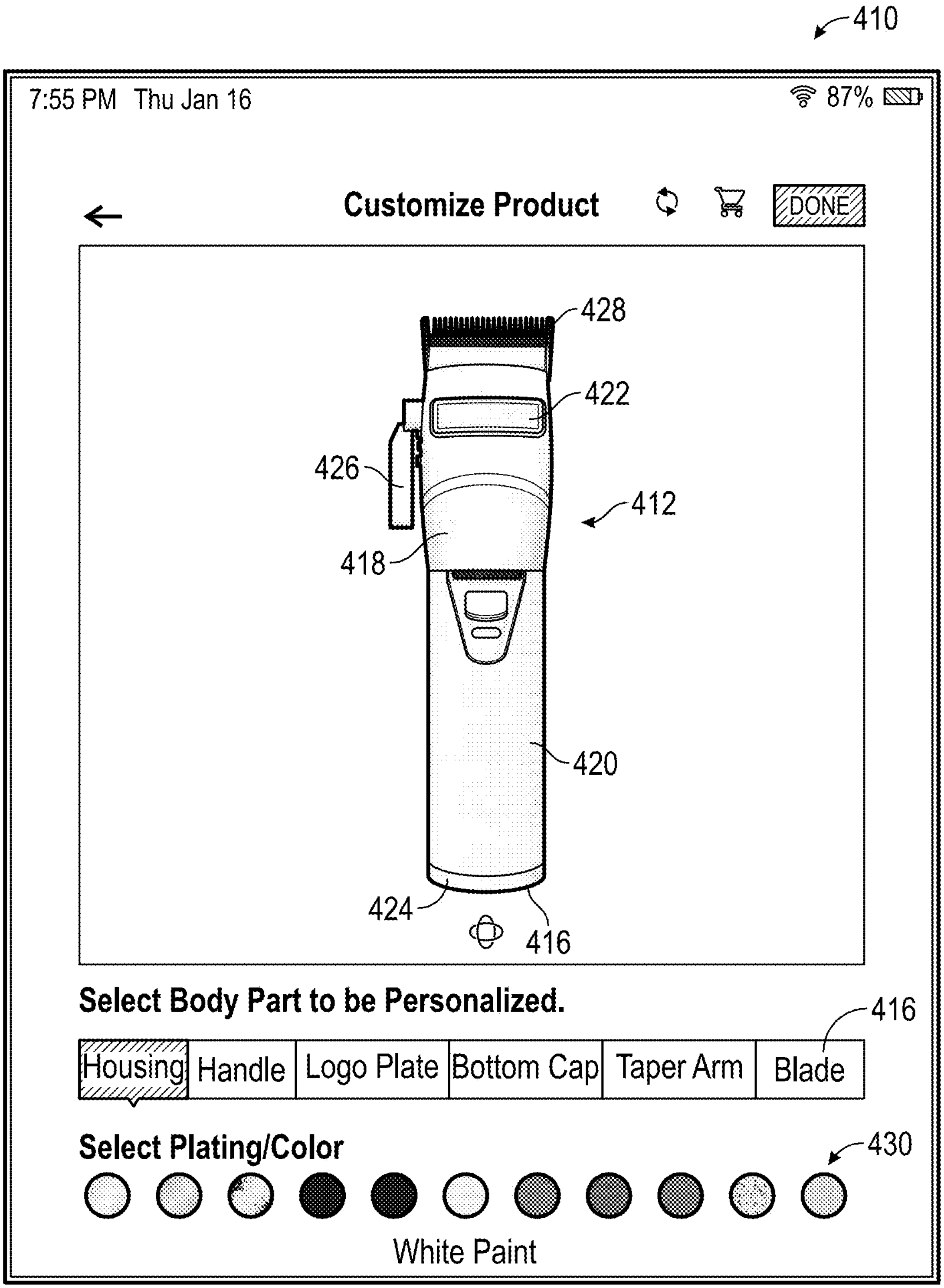
FIG. 5 is a representation of a is a view of a graphical interface of the mobile application, displaying a representation of a hair appliance to be customized, according to an embodiment of the invention.

FIGS. 4-18 illustrate one possible implementation of the mobile application or program accessed using remote terminal 110 to design the custom hair application, shown therein as a hair trimmer. As shown in FIG. 5, a start or home screen 400 is displayed upon opening of the application on the remote terminal 110. The home screen 400 may have a button or icon 402 that brings a user to a graphical design interface 410 through which a user may carry out the custom design process. In an embodiment, the home screen 400 may display an advertising, marketing and/or informational video on loop.

As shown in FIGS. 5-14, graphical interface system 410 preferably includes a hair appliance representation 412. The term hair appliance representation 412, as used throughout this specification and in the claims, refers to a three-dimensional embodiment of hair appliance within graphical interface system 410. Specifically, the term hair appliance preferably includes the structural design of the represented hair appliance. Additionally, the term hair appliance representation preferably includes any other design attributes including, but not limited to, patterns, shapes, designs, colors, images, and any other graphical feature of the outer surface of the represented hair appliance.

For the purposes of illustration, hair appliance representation 412 is depicted here in the form of a hair trimmer or hair clipper. However, in other embodiments, hair appliance representation 412 may be any other types of hair appliances including but not limited to, a hair dryers, curlers or other styling devices and/or articles.

Preferably, graphical interface system 410 may include provisions for modifying the view of hair appliance representation 412. In some embodiments, this may include a provision for moving hair appliance representation 412 to various regions of graphical interface system 410. In a preferred embodiment, this may include a provision for rotating hair appliance representation 412 about a set of axes.

In a preferred embodiment, graphical interface system 410 includes directional tool 414. In this embodiment, directional tool 414 is represented by a collection of arrows. In some embodiments, the graphical representation of directional tool 414 may be different. Preferably, directional tool 414 may be configured to change the view of hair appliance representation 412. Some examples of the types of changes in view include vertical and horizontal translation of hair appliance representation 412 with respect to a center of graphical interface system 410. In addition, directional tool 414 may be used to rotate hair appliance representation 412 about x, y, and/or z-axes. Using directional tool 414, a customer may change the view of hair appliance representation 412 in order to view different regions of hair appliance representation 412. In an embodiment, movement (translation, rotation, etc.) of the hair appliance representation 412 may be effected by clicking on the hair appliance representation (or pressing on the screen with a finger), and dragging the hair appliance representation to a desired orientation.

Generally, graphical interface system 410 may include provisions for modifying hair appliance representation 412. In some embodiments, graphical interface system 410 may include editing tools configured to modify the design of hair appliance representation 402. For example, graphical interface system 410 may include a toolbar 416 allowing a user to select the component of the hair appliance representation 412 to customize. In an embodiment, customizable components may include, for example, the housing 418, the handle 420, the logo plate 422, the bottom cap 424, the taper arm 426, and the blade 428.

Figure 6:
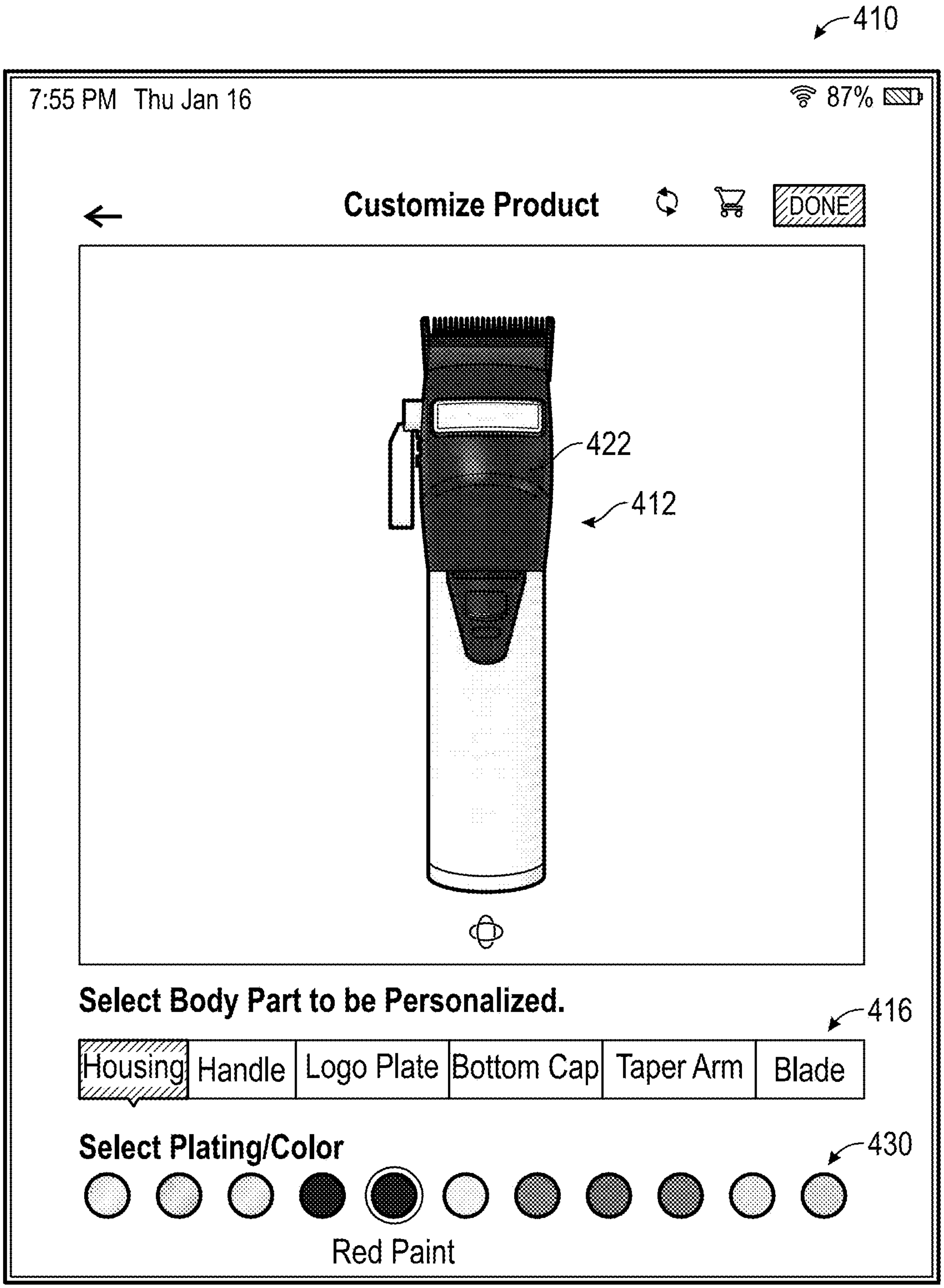
FIG. 6 is a representation of a housing customization page of the mobile application, according to an embodiment of the invention.

As shown in FIG. 6, the graphical interface system 410 can be utilized to customize a color of the housing 418. As shown, the graphical interface 400 displays a color palette 430 when the "Housing" icon on the toolbar 416 is selected. In an embodiment, the color palette 430 may include a plurality of colors (11 colors is shown in the color palette 430 of FIG. 6). When a color is selected for the housing 418, the hair appliance representation 412 is modified to display the housing 418 in the selected color.

Figure 7:
FIG. 7 is a representation of a handle customization page of the mobile application, according to an embodiment of the invention.

FIG. 7 illustrates that the graphical interface system 410 can be utilized to customize a color of the handle 420. As shown, the graphical interface 400 displays the color palette 430 when the "Handle" icon on the toolbar 416 is selected. When a color is selected for the handle 420, the hair appliance representation 412 is modified to display the handle 420 in the selected color.

Figure 8:
FIG. 8 is a representation of a logo plate customization page of the mobile application, according to an embodiment of the invention.

FIG. 8 illustrates that the graphical interface system 410 can be utilized to customize a color of the logo plate 422. As shown, the graphical interface 400 displays the color palette 430 when the "Logo Plate" icon on the toolbar 416 is selected. When a color is selected for the logo plate 422, the hair appliance representation 412 is modified to display the logo plate 422 in the selected color.

Figure 9:
FIG. 9 is a representation of a bottom cap customization page of the mobile application, according to an embodiment of the invention.

FIG. 9 illustrates that the graphical interface system 410 can be utilized to customize a color of the bottom cap 424. As shown, the graphical interface 400 displays the color palette 430 when the "Bottom Cap" icon on the toolbar 416 is selected. When a color is selected for the bottom cap 424, the hair appliance representation 412 is modified to display the bottom cap 424 in the selected color.

Figure 10:
FIG. 10 is a representation of a taper arm customization page of the mobile application, according to an embodiment of the invention.

FIG. 10 illustrates that the graphical interface system 410 can be utilized to customize a color of the taper arm 426. As shown, the graphical interface 400 displays the color palette 430 when the "Taper Arm" icon on the toolbar 416 is selected. When a color is selected for the taper arm 426, the hair appliance representation 412 is modified to display the taper arm 426 in the selected color.

Figure 11:
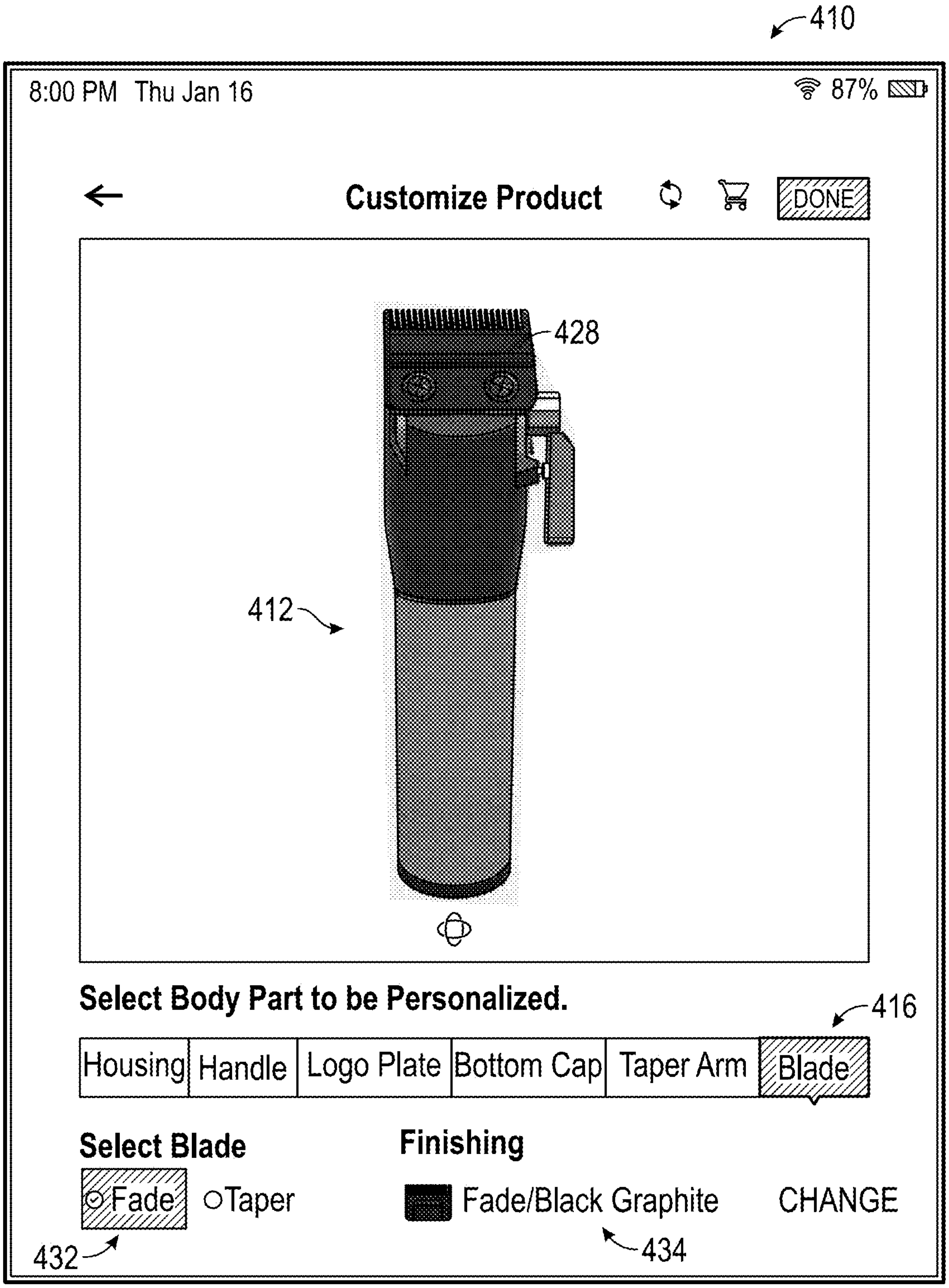
FIG. 11 is a representation of a blade customization page of the mobile application, illustrating selection of a blade type, according to an embodiment of the invention.
Figure 12:
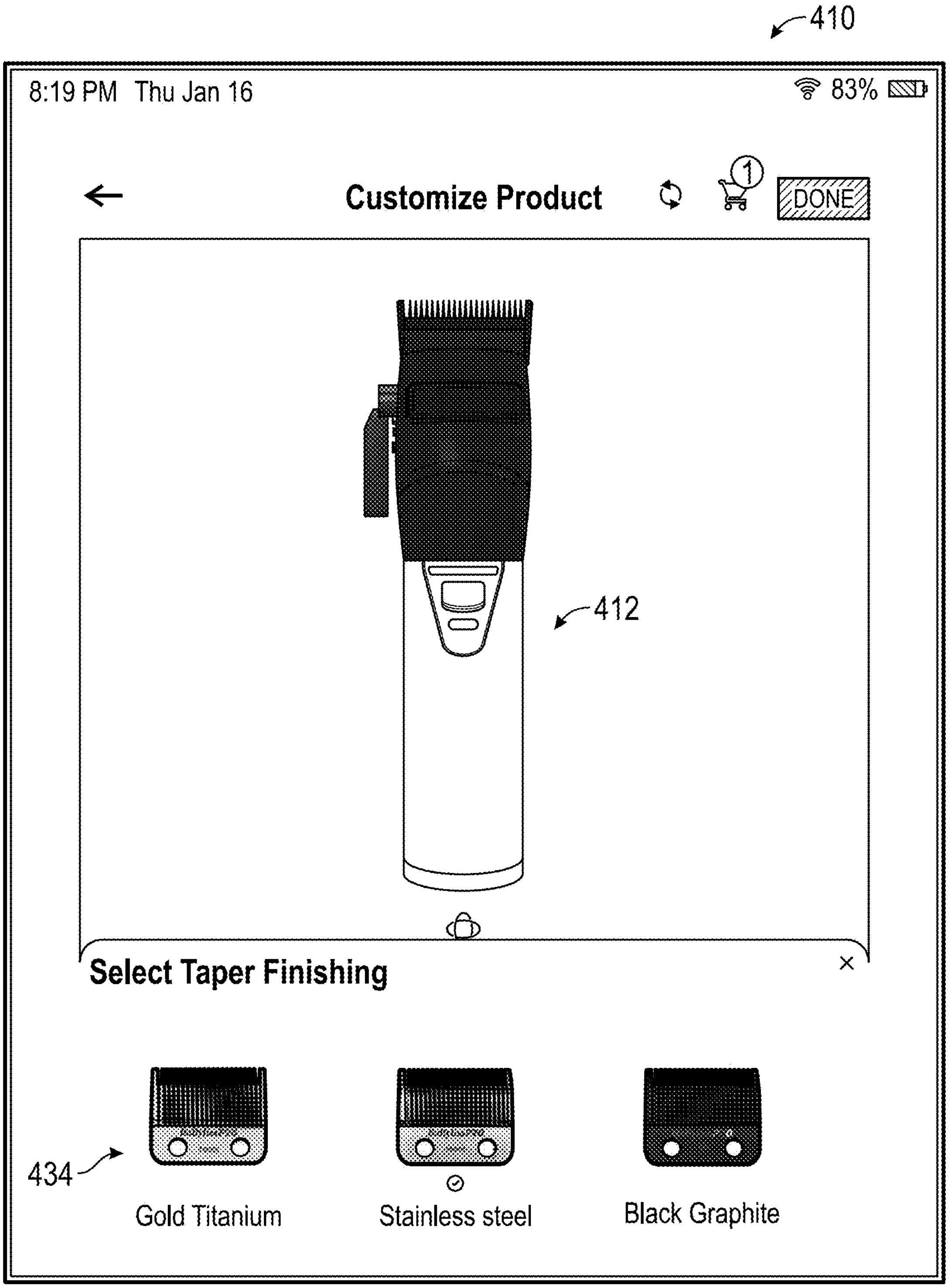
FIG. 12 is a representation of a blade customization page of the mobile application, illustrating selection of a blade finish, according to an embodiment of the invention.

FIGS. 11 and 12 illustrate that the graphical interface system 410 can be utilized to customize the blade 428. As shown, when the "Blade" icon on the toolbar 416 is selected, the graphical interface 400 displays a toolbar 432 via which the user may select a type of blade (e.g., fade or taper style blade) for the hair appliance, as well as toolbar 434 for selecting a finish or color for the blade (e.g., gold titanium, stainless steel, graphite, etc.). As indicated above, upon selection, the hair appliance representation 412 is modified to display the selected design/configuration.

Figure 13:
FIG. 13 is a representation of the graphical interface of the mobile application, illustrating a rotation feature thereof, according to an embodiment of the invention.
Figure 14:
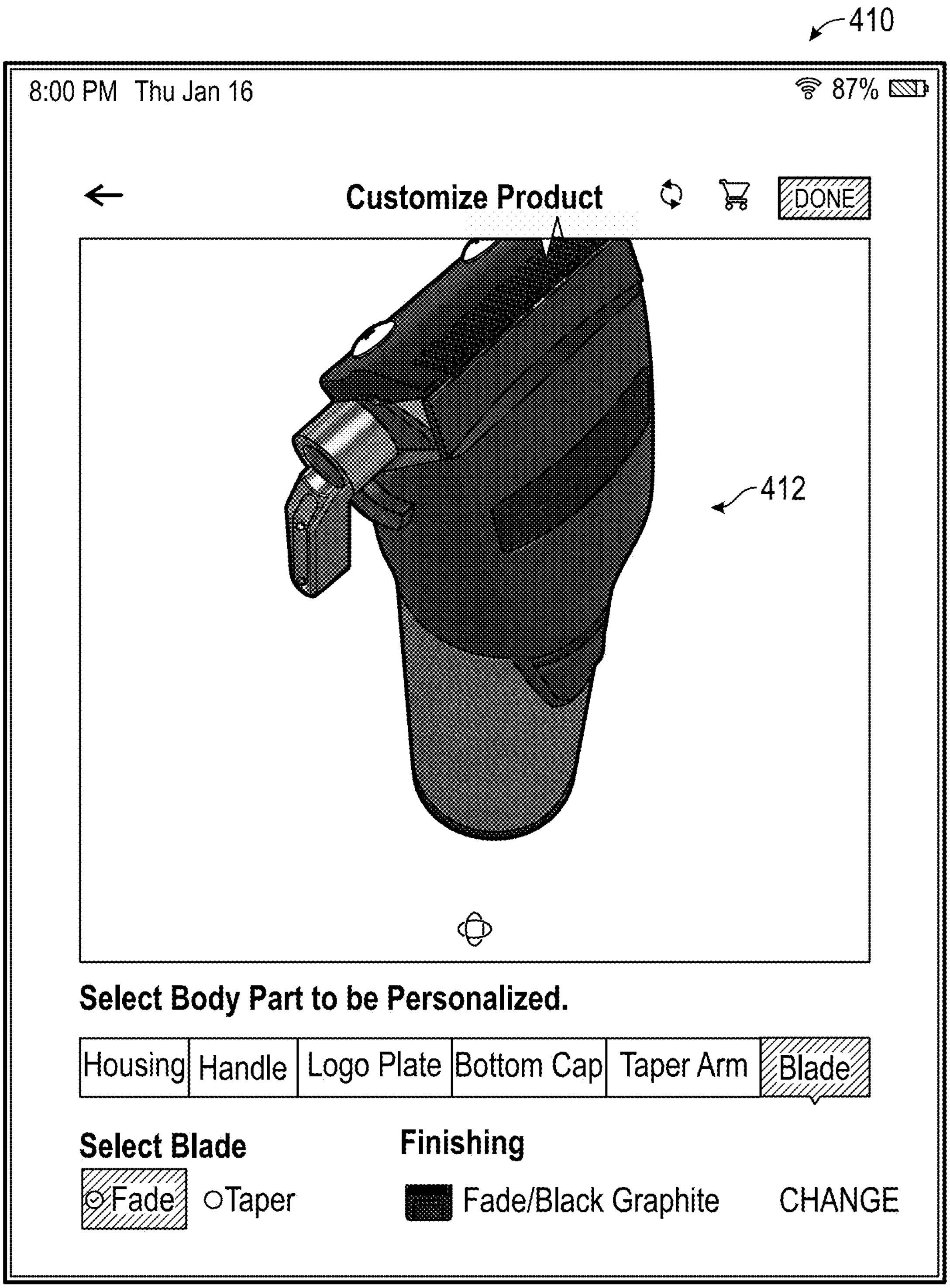
FIG. 14 is a representation of the graphical interface of the mobile application, illustrating a zoom feature thereof, according to an embodiment of the invention.

With reference to FIGS. 13 and 14, and as indicated above, the graphical interface 410 allows a user to rotate the hair appliance representation 412 to almost any configuration/angle/view, at any point during the design/build process. In addition, the graphical interface 410 also provides the ability to zoom in or out to view any part of the hair appliance representation 412 in more detail, at any point during the design/build process.

Figure 15:
FIG. 15 is a representation of a customization summary page of the mobile application, according to an embodiment of the invention.
Figure 16:
FIG. 16 is a representation of a pickup page of the mobile application, according to an embodiment of the invention.
Figure 17:
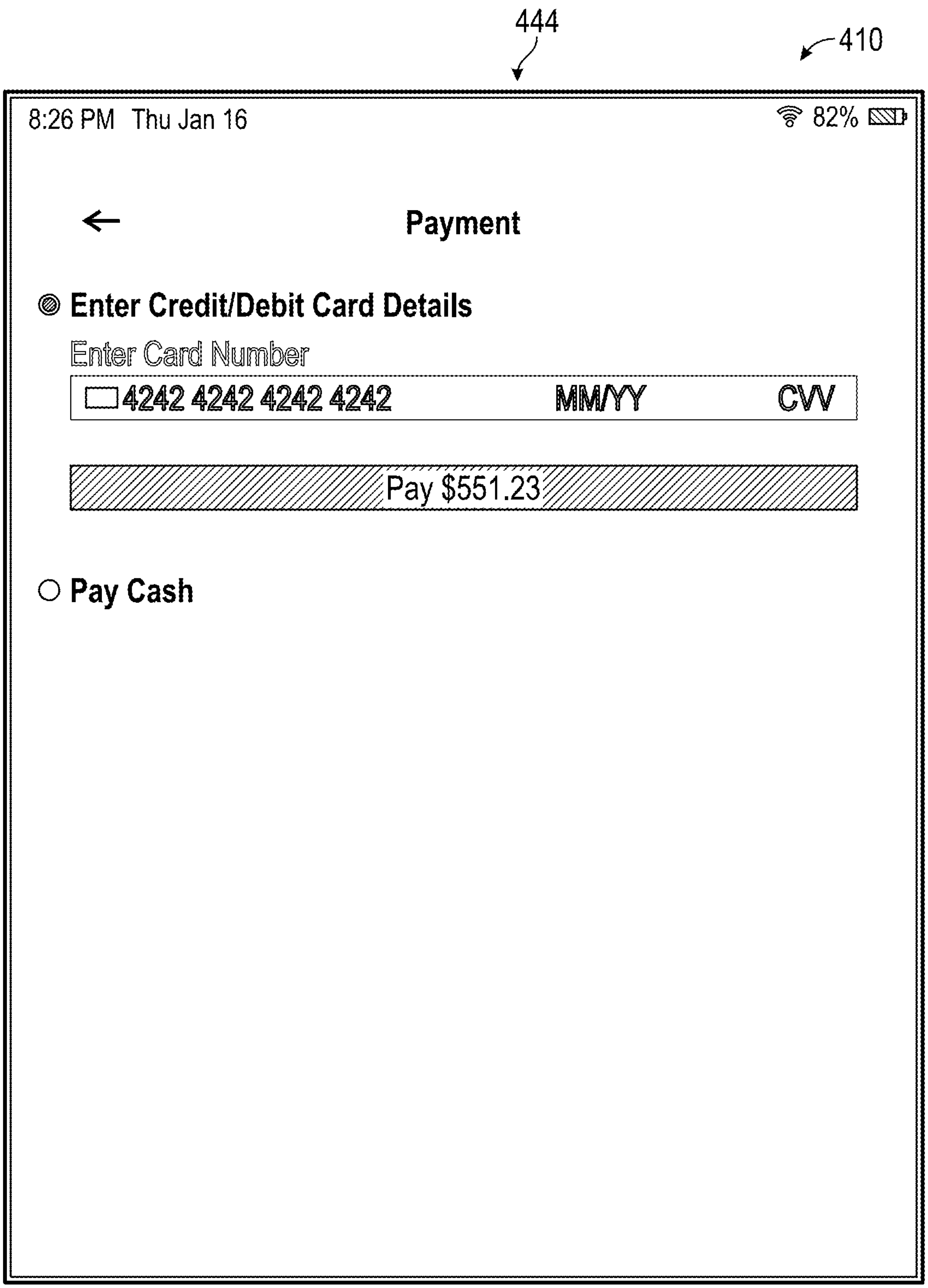
FIG. 17 is a representation of a payment page of the mobile application, according to an embodiment of the invention.
Figure 18:
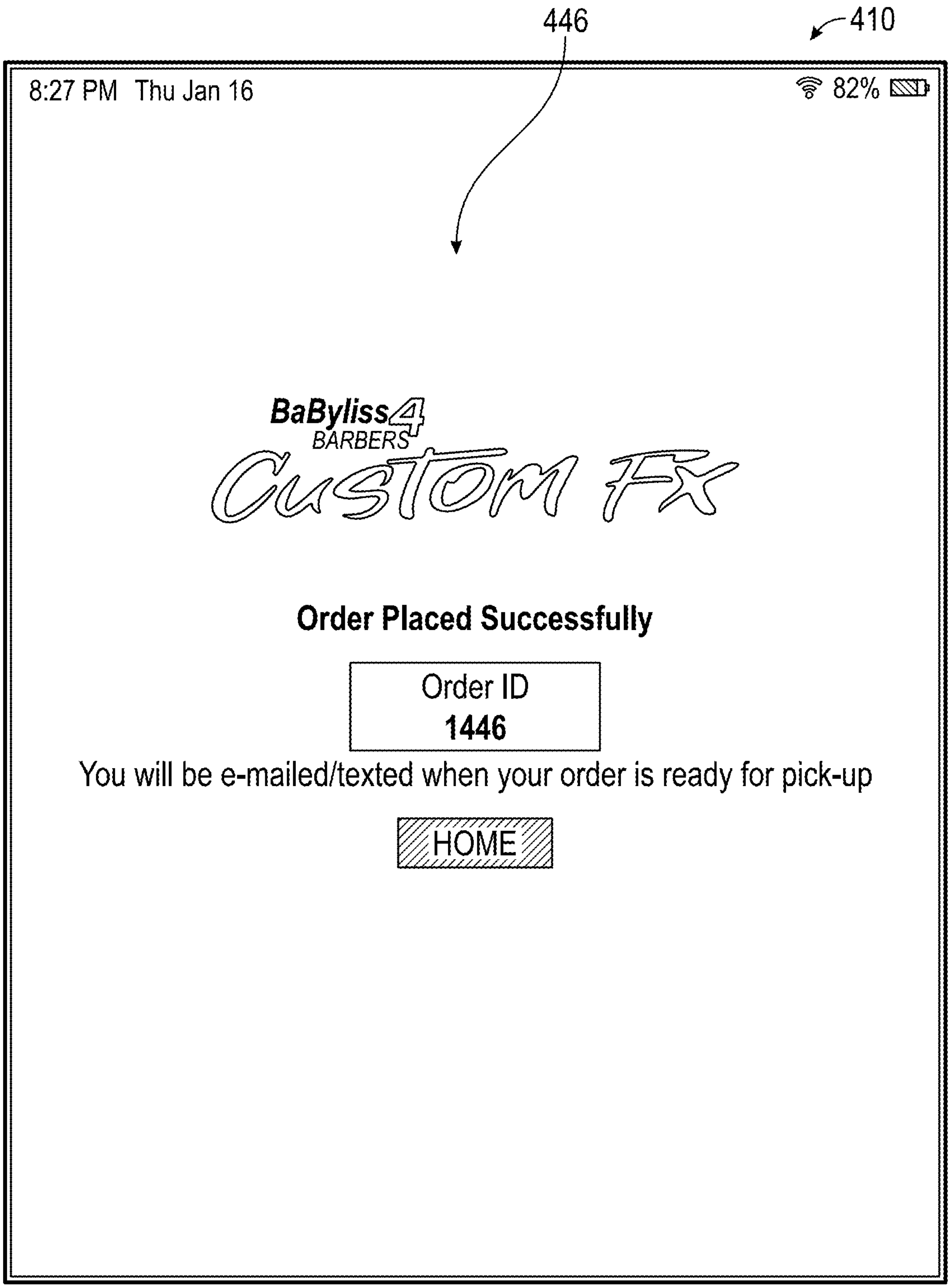
FIG. 18 is a representation of an order summary page of the mobile application, according to an embodiment of the invention.

Turning now to FIG. 15, once the design is complete, the application will direct a user to a summary page 440, displaying the model selected, the colors/configuration of each component, and an item total, as well as an option to edit or delete the design. After clicking a "Continue to Checkout" button, the user is then brought to a "Pickup Details" page 442, shown in FIG. 16, with user-selectable pickup or delivery options, as well as fields to enter contact information. After filling in the fields and clicking the "Continue to Checkout" button, a "Payment" page 444 is displayed, as shown in FIG. 17. The payment page 444 contains fields allowing a user to enter a payment method. Finally, as shown in FIG. 18, the graphical interface 410 displays an order confirmation page 446 with an order number.

The graphical interface 410, displayed on the remote terminal 110, therefore allows a user customize color on at least 5 different hair clipper parts (e.g., housing, handle, logo plate, bottom cap, & taper arm), as well as choose. The user can also choose a blade of choice. In an embodiment, there may be 11 color options and 5 blade options.

Preferably, once the customer has completed the design for the hair appliance, the design may be finalized and submitted to the factory, as previously discussed. Once the designs have been received by the factory, the hair appliance may be produced by a series of steps as discussed with respect to FIG. 3.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A method for customizing a hair appliance, the method comprising:

generating a rendering of a hair appliance to be customized on a graphical interface via a graphical display of a remote terminal, the graphical interface being displayed by a mobile software application executing on the remote terminal, wherein the remote terminal is a tablet or smartphone;

displaying the graphical interface on the graphical display of the remote terminal, the graphical interface including:

(i) the rendering of the hair appliance, including a three-dimensional embodiment of the hair appliance capable of being rotated about one or more axes, (ii) a first toolbar including first selectable buttons corresponding to customizable components, wherein the customizable components include a housing, a handle, a logo plate, a bottom cap, a taper arm, and a blade, (iii) a color palette including second selectable buttons corresponding to colors for each of the housing, the handle, the logo plate, the bottom cap, and the taper arm, the color palette being displayed when a corresponding one of the first selectable buttons is selected, and (iv) in response to selection of the first selectable button corresponding to the blade, displaying a second toolbar including radio buttons corresponding to different blade types and an action button for changing a color or finish of the blade, the action button being configured to cause presentation of a blade color or finish selection interface, wherein the color palette is not displayed when the first selectable button corresponding to the blade is selected;

receiving user input through the remote terminal modifying at least one customizable component of the hair appliance;

generating a modified rendering of the hair appliance to be custom manufactured based upon the user input received, the modified rendering of the hair appliance including a modified three-dimensional embodiment of the hair appliance capable of being rotated about the one or more axes, the modified rendering of the hair appliance configured for translation in a vertical direction and a horizontal direction;

displaying the modified rendering of the hair appliance on the graphical interface via the graphical display of the remote terminal;

directing a user to a summary page on the graphical interface via the graphical display of the remote terminal based on the user input received, the summary page including a total cost and an option to edit the hair appliance;

transmitting, from the remote terminal to a manufacturing system of a factory via a network connection, a customized design of the hair appliance corresponding to the modified rendering of the hair appliance, as generated;

receiving, by the manufacturing system of the factory, the customized design of the hair appliance corresponding to the modified rendering of the hair appliance, as transmitted; and manufacturing the hair appliance by the manufacturing system of the factory based on the customized design, as received;

wherein the hair appliance is a hair clipper, wherein the different blade types include a fade style blade and a taper style blade, and wherein the color or finish of the blade includes gold titanium, stainless steel, or black graphite.

2. The method according to claim 1, wherein:

the at least one customizable component, as modified, includes the housing, the handle, the logo plate, the bottom cap, and the taper arm of the hair clipper.

3. The method according to claim 2, wherein:

a color of at least one of the housing, the handle, the logo plate, the bottom cap and the taper arm is modified in the customized design.

4. The method according to claim 1, wherein:

rotating the modified rendering of the hair clipper on the graphical display of the remote terminal in response to the user input.

5. A system for customizing a hair trimmer, comprising:

a remote terminal in communication with a manufacturing system of a manufacturing facility via a network, the remote terminal being configured to:

generate a rendering of a hair trimmer to be customized on a graphical interface via a graphical display of the remote terminal, the graphical interface being displayed by a mobile software application executing on the remote terminal, wherein the remote terminal is a tablet or smartphone, displaying the graphical interface on the graphical display of the remote terminal, the graphical interface including:

(i) the rendering of the hair trimmer, including a three-dimensional embodiment of the hair trimmer capable of being rotated about one or more axes, (ii) a first toolbar including first selectable buttons corresponding to customizable components, wherein the customizable components include a housing, a handle, a logo plate, a bottom cap, a taper arm, and a blade, (iii) a color palette including second selectable buttons corresponding to colors for each of the housing, the handle, the logo plate, the bottom cap, and the taper arm, the color palette being displayed when a corresponding one of the first selectable buttons is selected, (iv) in response to selection of the first selectable button corresponding to the blade, displaying a second toolbar including radio buttons corresponding to different blade types and an action button for changing a color or finish of the blade, the action button being configured to cause presentation of a blade color or finish selection interface, wherein the color palette is not displayed when the first selectable button corresponding to the blade is selected, receive user input through the remote terminal modifying at least one customizable component of the hair trimmer, generate a modified rendering of the hair trimmer to be custom manufactured based upon the user input received, the modified rendering of the hair trimmer including a modified three-dimensional embodiment of the hair trimmer capable of being rotated about the one or more axes, the modified rendering of the hair trimmer configured for translation in a vertical direction and a horizontal direction, display the modified rendering of the hair trimmer on the graphical interface via the graphical display of the remote terminal, direct a user to a summary page on the graphical interface via the graphical display of the remote terminal based on the user input received, the summary page including a total cost and an option to edit the hair trimmer, and transmit, from the remote terminal to a manufacturing system of a factory via a network connection, a customized design of the hair trimmer corresponding to the modified rendering of the hair trimmer, as generated, the manufacturing system being configured to:

receive the customized design of the hair trimmer corresponding to the modified rendering of the hair trimmer, as transmitted, and manufacture the hair trimmer by a factory based on the customized design, as received, wherein the hair trimmer is a hair clipper, wherein the different blade types include a fade style blade and a taper style blade, wherein the color or finish of the blade includes gold titanium, stainless steel, or black graphite, wherein the modified rendering of the hair clipper includes a rendering of a user-selected configuration of a housing, a handle, a logo plate, a bottom cap and the taper arm applied to the hair clipper, and wherein a user-selectable configuration of the blade includes a selection of blade type and the color or finish of the blade, the blade type being the fade style blade or the taper style blade, and the color or finish of the blade.

6. The system of claim 5, wherein:

the remote terminal is configured to automatically transmit information regarding the user input and/or the modified rendering of the hair clipper to the manufacturing facility for manufacture of the hair clipper in accordance with the user input.

* * * * *